(12) United States Patent
Jagannatha et al.

(10) Patent No.: US 10,592,136 B2
(45) Date of Patent: Mar. 17, 2020

(54) BLOCK BASED STRIPED BACKUPS

(71) Applicant: EMC IP Holding Company LLC, Hopkinton, MA (US)

(72) Inventors: Manjunath Jagannatha, Bangalore (IN); Ravi Shankar Panem, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/024,277

(22) Filed: Jun. 29, 2018

(65) Prior Publication Data

US 2020/0004438 A1    Jan. 2, 2020

(51) Int. Cl.
  *G06F 3/06* (2006.01)
(52) U.S. Cl.
  CPC .......... *G06F 3/0619* (2013.01); *G06F 3/0641* (2013.01); *G06F 3/0689* (2013.01)
(58) Field of Classification Search
  CPC ..... G06F 11/1446–1453; G06F 3/0619; G06F 3/0641; G06F 3/0689
  See application file for complete search history.

(56) References Cited

U.S. PATENT DOCUMENTS

| | | | | |
|---|---|---|---|---|
| 7,650,341 B1* | 1/2010 | Oratovsky | ........ | G06F 11/1435 707/999.01 |
| 9,165,001 B1* | 10/2015 | Upadhyay | ........ | G06F 11/1453 |
| 10,078,555 B1* | 9/2018 | Kumar | ........ | G06F 16/188 |
| 2005/0038836 A1* | 2/2005 | Wang | ........ | G06F 3/0601 |
| 2013/0036289 A1* | 2/2013 | Welnicki | ........ | G06F 3/0608 711/173 |

OTHER PUBLICATIONS

Li Zhao-SpeedStream-A Real-time stream data processing platform in the cloud-Chinese Academy of Sciences-Sep. 2015 (Year: 2015).*
Yingwei Lou, Binbin Zhang, Xialin Wang, Zhenlin Wang, Yifeng Sun, Haogang Chen, Live and incremental whole-system migration of virtual machines using block-bitmap, 2008 IEEE International Conference on Cluster Computing. (Year: 2008).*

* cited by examiner

*Primary Examiner* — Khoa D Doan
(74) *Attorney, Agent, or Firm* — Staniford Tomita LLP

(57) ABSTRACT

Performing block based striped backups in a storage system, by: obtaining a used block bitmap for a source volume to be backed up, defining a number of parallel save streams to simultaneously transmit separate data streams from the source volume to backup media of the storage system, converting the used block bitmap to the respective data streams based on the number of defined parallel save streams, embedding each data stream in a differencing disk payload, and maintaining a differencing disk chain across all data streams to create a last differencing disk that refers to all preceding differencing disks. The storage system may include AFTD devices in which the method mounts the last differencing disk to present a complete saveset, or data domain devices in which case the method synthesizes the respective data streams after a backup operation to present a complete saveset.

20 Claims, 7 Drawing Sheets

BLOCK BASED STRIPED BACKUPS

TECHNICAL FIELD

Embodiments are directed to data backup, and specifically to performing block based striped backups to reduce backup windows during backup operations.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage. Data protection and comprehensive backup and disaster recovery (DR) procedures become even more important as enterprise level networks grow and support mission critical applications and data for customers.

A backup window is the time available to perform and finish a backup operation, which is directly related to the backup process itself. Depending on the size of the data to be backed up (savesets), system down time, which may be on the order of hours, must be identified in a business process. Because data backup is a necessary activity, this leads to definite reduction in productive hours. Backup snapshot capability at various levels such as volume and application, alleviate the need for down time and enable backup operations to perform even during production. However, there is still a need to perform swift backups of enormous data sets (ranging in TBs or even more). Also, conventional backup technologies typically send data in a single stream. Block based backup techniques greatly improve backup times over file level backups. However, present block based backups stream data sequentially, resulting in poor utilization of network resources, and under-utilization of network resources.

What is needed, therefore, is a backup method that reduces backup window times and that streams multiple extents of savesets in parallel to achieve rapid backups.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
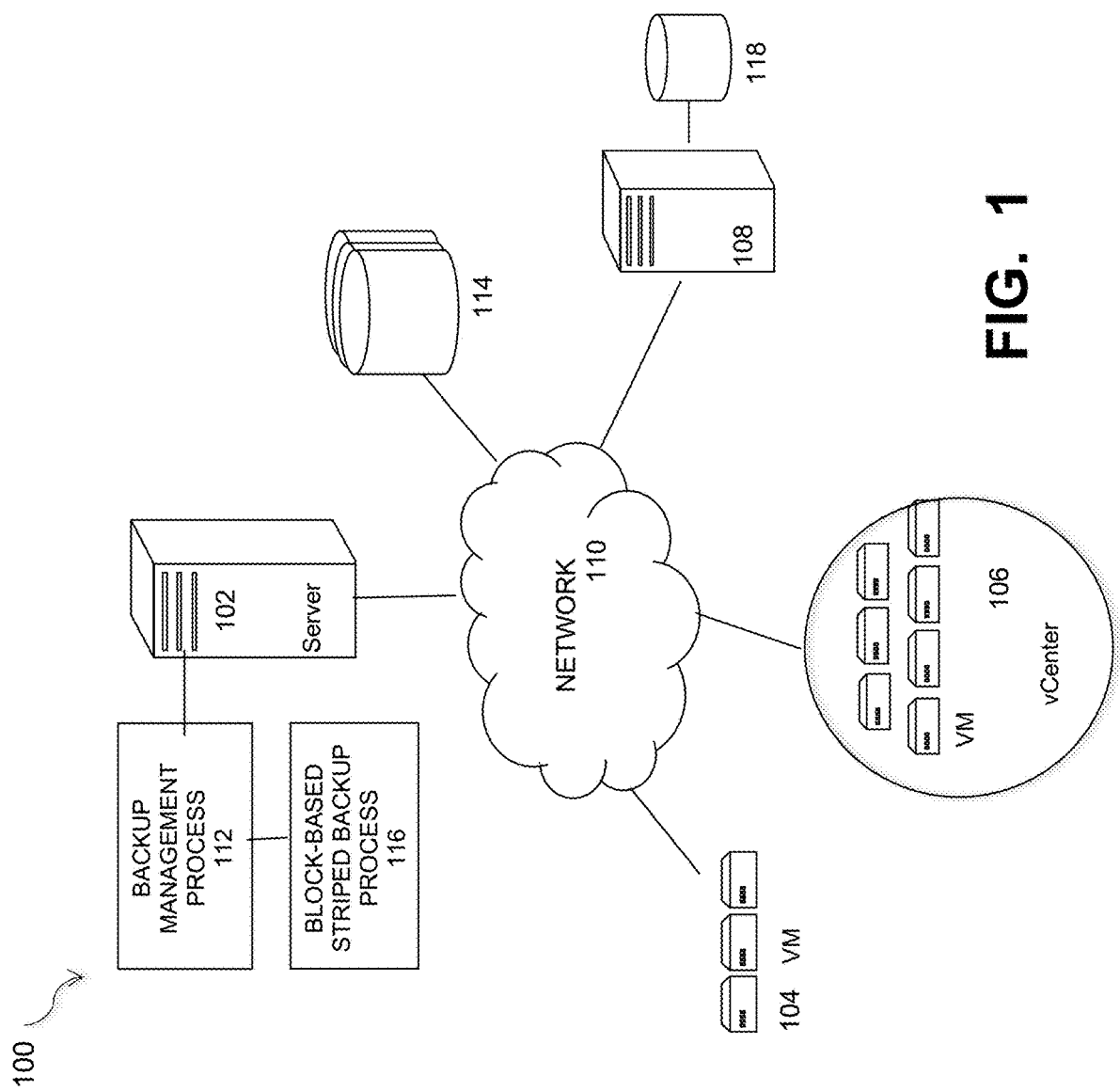
FIG. 1 illustrates a computer network system that implements one or more embodiments of block based striped backup process for backing up data in a large-scale computer network.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of block based striped backup process for backing up data in a large-scale computer network. In system 100, a number of backup targets, such as VMs or groups of VMs 104 are provided to backup data from one or more data sources. Target VMs may also be organized into one or more vCenters 106 representing a physical or virtual network of many virtual machines (VMs). The target storage devices backup data from one or more data sources, such as computer 108, which may have attached local storage 118 or utilize networked accessed storage devices 114.

The data sourced by a data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the backup targets (e.g., VMs 104 and 106), and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

For the embodiment of FIG. 1, network system 100 includes a server 102 that executes a data backup process 112 with a block based striped backup process 116 that streams multiple extents of a data saveset in parallel to achieve rapid backups. Process 116 may be a process executed within or as part of backup process 112, or it may be a separate or sub-process executable in conjunction with backup process 112. The process 116 provides a mechanism of very fast backups in system 100. Through processes described in greater detail below, it effectively provides effective utilization of network resources, produces save sets in directly mountable format ensuring instant recoveries. The technique can be used for any media such as Data Domain, AFTD (Advanced File Type Device), and Cloud. It ensures smaller backup windows, and can be used for both full and incremental backups.

In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. For backup systems using virtual machines as backup targets, a hypervisor program is used to create and run the virtual machines. A computer running the hypervisor is a host machine and all virtual machines are guest machines running guest operating systems (OS). The hypervisor provides the guest OSs with a virtual operating platform and manages the execution of the VMs. In an embodiment, the backup management process 112 is configured to operate with the Hyper-V hypervisor, which is part of the Microsoft Windows server products, although other hypervisors may also be used.

In an embodiment, system 100 represents a backup platform (e.g., EMC Networker) that supports block-based backups (BBB) of volumes and files in a virtual hard disk (VHD or VHDx) format. For this embodiment, the files to be backed up are virtual hard disk files that may be formatted as a VHD (Microsoft Virtual Hard Disk Image) or Microsoft VHDx file. The VHDx format is a container format, which can contain disk related information and allows files to be mounted and used as a regular disk. Volumes such as NTFS/ReFS/FAT32 or any file system which the OS supports on the mounted disk can also be created. Differencing VHDx's can be created which will have internal references to parent VHDx. Embodiments can also be applied to other virtual disk formats such as VMDK (Virtual Machine Disk) and the like.

Block based backups typically bypass files and file system s almost completely. The OS file system divides the hard disk, volume or RAID array into groups of bytes called blocks (fixed size) or extents (variable size which are typically ordered 0–N. A differencing disk is generally a type of virtual hard disk VHD that stores and manages changes made to another VHD or its parent VHD, and is used in virtual environments to track, store, manage and restore only the changes or modifications applied on a VHD.

Figure 2:
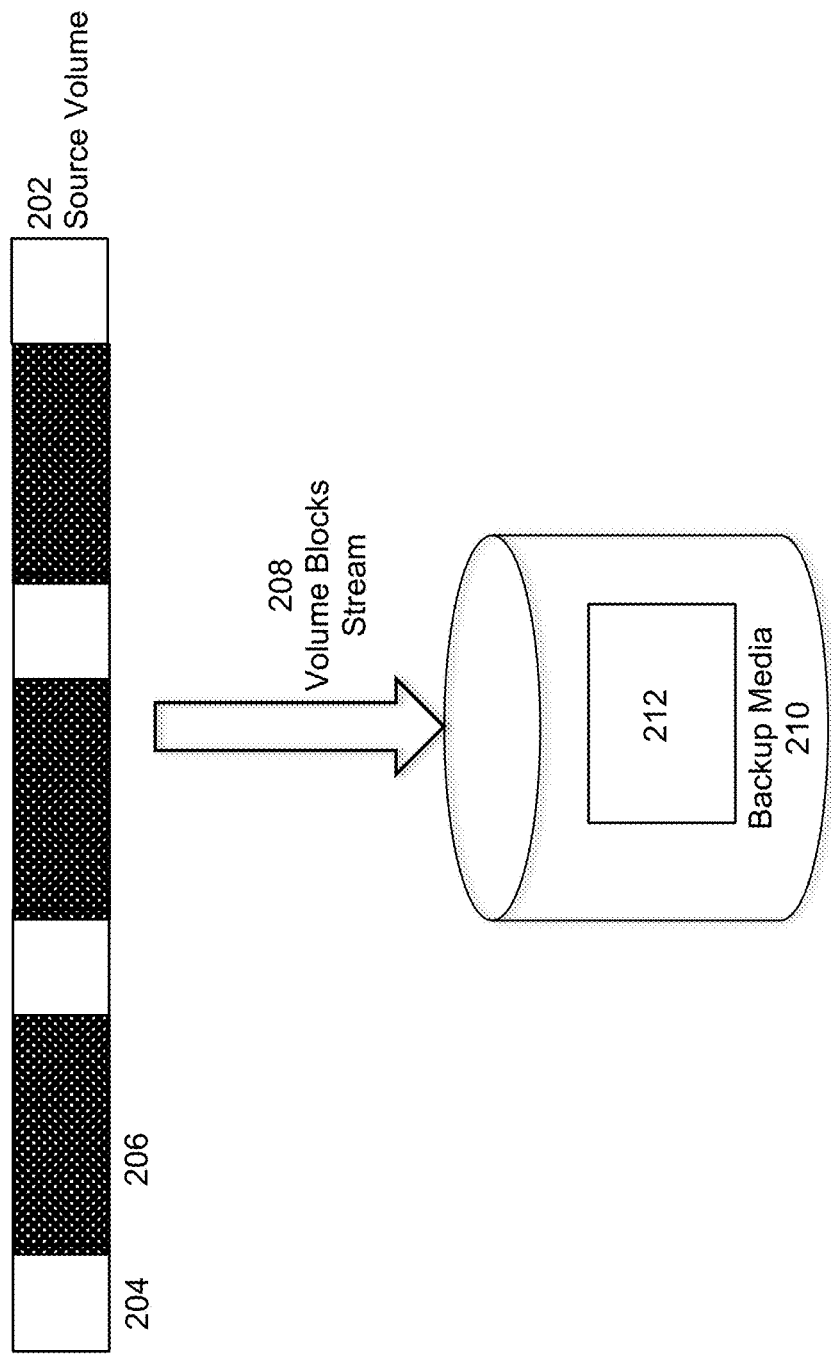
FIG. 2 illustrates an example block based backup operation, in accordance with some embodiments.

FIG. 2 illustrates an example block based backup operation, in accordance with some embodiments. As shown in FIG. 2, a source volume 202 comprises a number of used blocks 204 and unused blocks 206. During a backup process, the blocks of the source volume 202 are streamed 208 to the backup media 210 to produce backup saveset 212 comprising the backup of the source volume on the backup disk or VHD (virtual disk). In a block based backup system, the backup process reads the used blocks 204 in the order that they are on the source disk, not the order that they appear in files, which tend to be heavily fragmented, due to file system storage that scatters blocks of a file across the disk. As stated above, block based backups bypass the file system and read data directly form the source disk or volume. Block based backup applications can either read data in the same sized blocks as the file system or in different sized blocks. These used blocks are embedded as payload blocks in a virtual disk format such as VHDx and stored as backup savesets.

Block based backups processes typically need point-in-time snapshots to get consistent backups. In general, a snapshot is a read-only copy of the data set at a particular point in e, and allows applications to continue writing their data. The backup process starts by taking a snapshot of a live running volume. It then read block level data from the snapshot, which typically uses a copy-on-write mechanism that maintains the snapshot by pausing writes that overwrite data in the snapshot and making a backup copy to another location before allowing the write to proceed. A typical block based backup process such as illustrated in FIG. 2, thus proceeds by (1) taking a point-in-time snapshot of live volume 202, (2) computing checksum deltas by reading all disk blocks 204, 206), (3) reading deltas, and (4) deleting the point-in-time snapshot.

For some embodiments, the saveset 212 may be created based on the Hyper-V Virtual Hard Disk (VHDX) format, or other virtual disk format. The saveset 212 may be configured to store full backup information of a parent volume (e.g., source volume 202). For some embodiments, the backup operation that backs up the parent volume to the file 204 is performed using a block based backup (BBB) operation in which the source data is read from the parent volume 202 block by block regardless of the number of files stored in the parent volume. A technique of backup process 112 provides for backing up the used blocks of a file by identifying the file extents occupied by the file. In general, a file extent is a contiguous area of storage reserved for a file in a file system, represented as a range, and any file can have zero or more extents. The file extents provide the starting offset and the length of the particular extent occupied by the file. In other specific embodiments, the system further provides for incremental backups and artificially synthesizing full backups at the file or sub-file level.

The backup storage server 102 includes a catalog and local backup media and/or interfaces to other VM-based backup target to store data backed up from the data source 108 or other clients. The backed up data may include a volume, portion of a volume, applications, services, user-generated or user data, logs, files, directories, databases, operating system information, configuration files, machine data, system data, and so forth. A catalog may be used that provides an index of the data stored on the backup storage server 102. The backed up data may be stored a logical entity referred to as a saveset (e.g., saveset 212). The catalog may include metadata associated with the backup (e.g., saveset) such as an identification of the file or files stored on the backup storage server (e.g., globally unique identifier (GUID) of a backed up database), the time and date of backup, size of the backup, path information, and so forth.

In an embodiment, full or incremental backups may be supported. The incremental backup virtual disks may be created after the creation of the saveset that stores the full backup information of the parent volume. The incremental backup virtual disks may store only the changed blocks in the parent volume. The set of a full backup virtual disk and one or more incremental backup virtual disks may be saved together in a virtual disk format and can be mounted for recovery. The full backups and incremental backups comprise virtual disk files, which may be merged to create an artificially synthesized full backup in deduplication storage devices like Data Domain.

Figure 3:
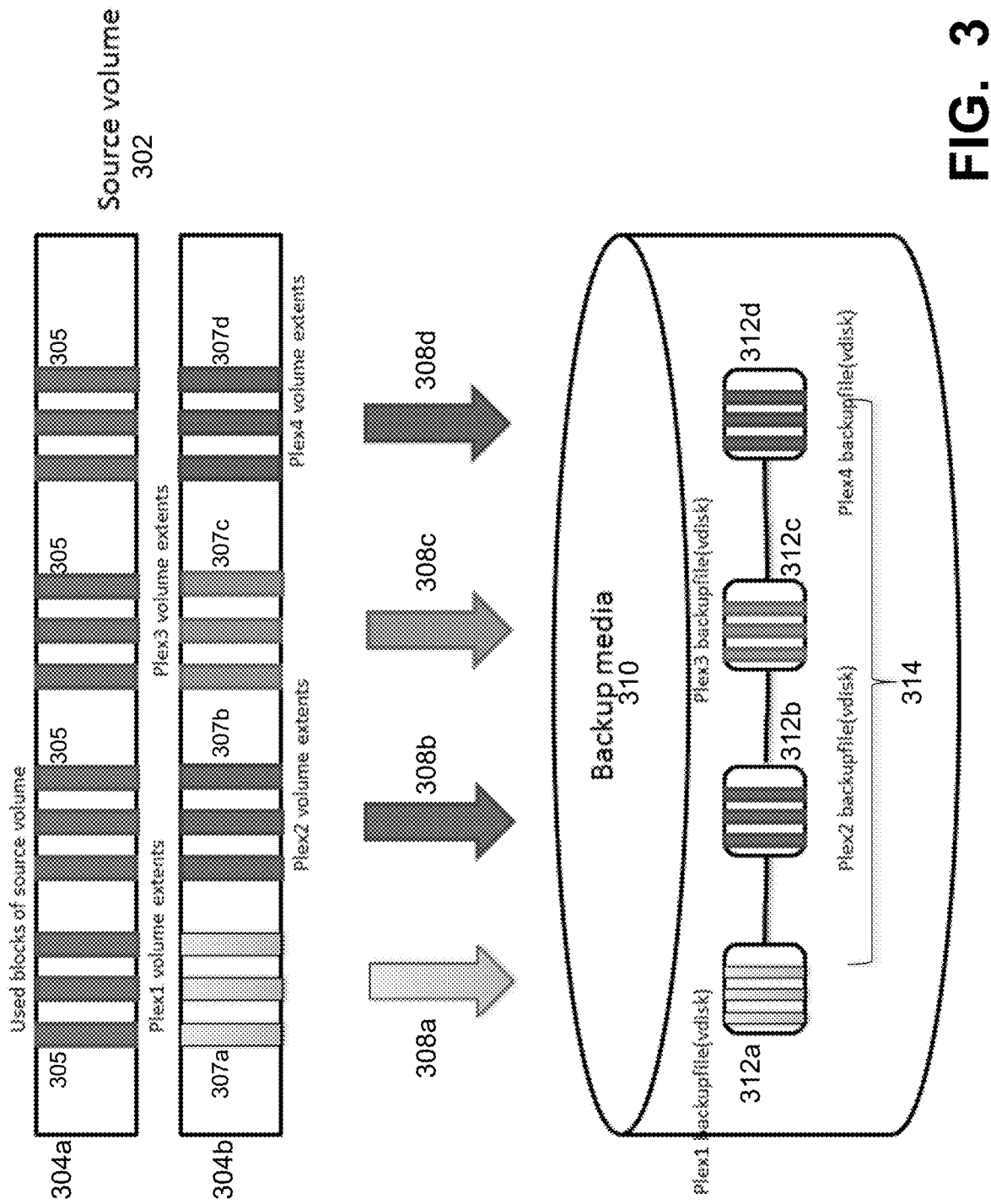
FIG. 3 illustrates a block based backups using a striped backup process, under some embodiments.

In an embodiment, the block based striped backup process 116 of FIG. 1 provides a process that streams multiple extents of a save set in parallel to increase the speed of backups performed by process 112. FIG. 3 illustrates a block based backups using a striped backup process, under some embodiments. For the embodiment of FIG. 3, a source volume 302 comprises sets of used blocks 305 in a first volume representation 304a. The used blocks are organized into sets of individual data streams or "plexes" denoted 307a, 307b, 307c, and 307d in a second volume representation 304b. Each plex 304 is made up of extents converted from a part of the used block bitmap of the source volume 304a. These plexes are equal in size. The individual plexes are defined by respective volume extents denoted in FIG. 3 as: Plex1 volume extents, Plex2 volume extents, Plex3 volume extents, and Plex4 volume extents. The separate plex volume extents are streamed in parallel through respective streams 308a, 308b, 308c, and 308d to the backup media 310. The level or amount of parallelism, i.e., the number of individual plex save streams, is selected based on system constraints and requirements. For example, the appropriate number generally comprises the number of data streams that can be supported by a differencing disk chaining mechanism of the storage system. Depending on the network bandwidth and size of the source volume, it can be divided into 8 plexes or 4 plexes. For small volumes, just two plexes would generally be sufficient. This will prevent the overhead of creating more differencing disks and embedding smaller payloads within them. The backup data saveset thus comprises the individual plex backup files 312a, 312b, 312c, 312d concatenated together to form the single saveset 314.

Figure 4:
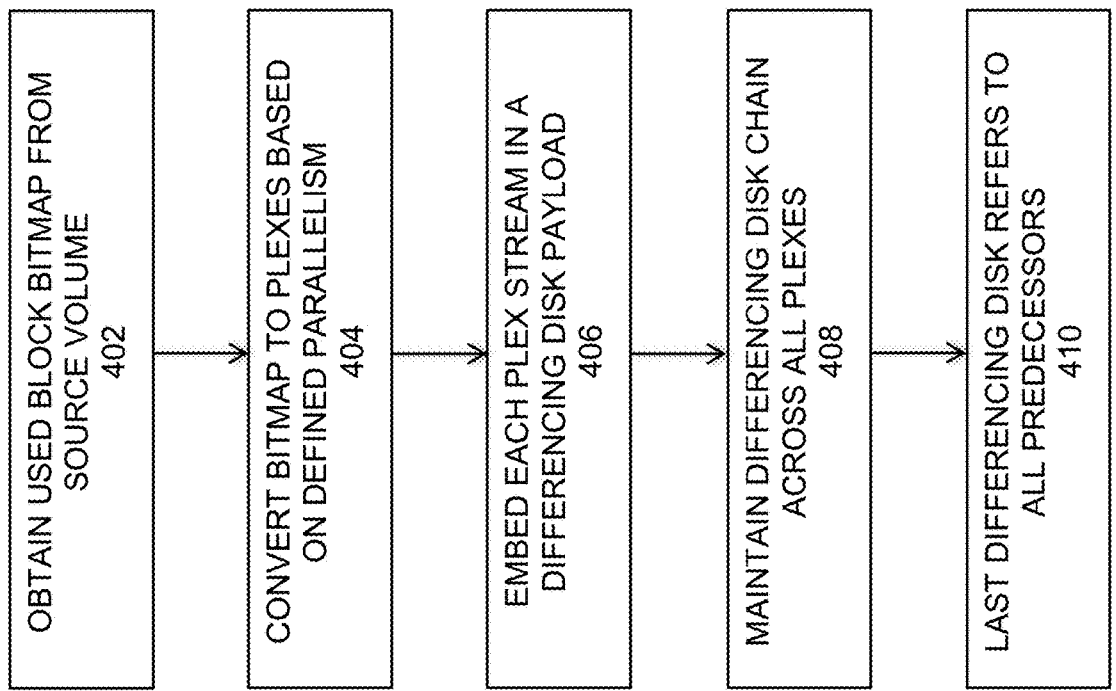
FIG. 4 is a flowchart that illustrates an overall process of performing block based striped backups under some embodiments.

FIG. 4 is a flowchart that illustrates an overall process of performing block based striped backups under some embodiments. As shown in FIG. 4, the process starts by obtaining the used block bitmap from the source volume, 402. The used block bitmap is converted to plexes (data streams) depending on the defined level of parallelism, 404. The plex data is thus streamed in parallel, where each plex is made up of extents converted from a part of the bitmap, and the separate plexes are all equal in size. Each plex stream is then embedded in a differencing disk payload, 406. One differencing disk is defined as a parent disk. A differencing disk chain is maintained across all the plexes, 408. When mounted, the last differencing disk refers to its predecessors and presents a backup of the entire source volume, 410.

As stated above, embodiments of the block based striped backup process can be used with various different backup systems, such as Data Domain (DD) and AFTD. The processing details regarding mounting of the last differencing disk and presentation of the source volume backup shown in block 410 of FIG. 4 may differ depending on the backup system. For example, in the case of Data Domain systems, the plex streams are synthesized after backup to present as a single saveset, and in the case of AFTD, the chain of differencing disks comprises a saveset where only the last differencing disk remains mountable.

Figure 5:
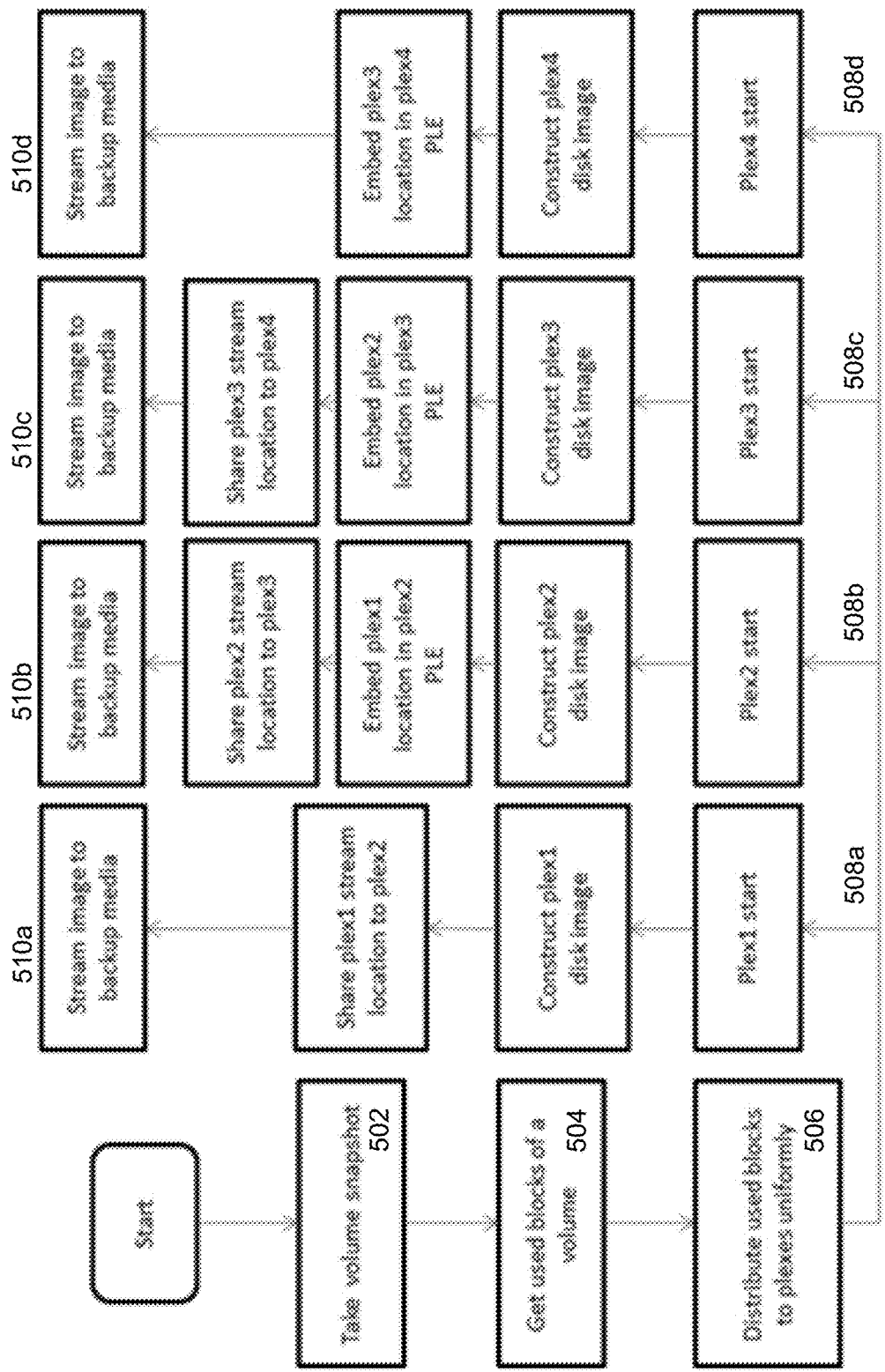
FIG. 5 is a flowchart that illustrates a method of performing block based striped backups in an AFTD system, under some embodiments.

FIG. 5 is a flowchart that illustrates a method of performing block based striped backups in an AFTD system, under some embodiments. As shown in FIG. 5, the process begins by taking a volume snapshot, 502. The system then gets the used blocks of the volume, 504. It then distributes the used blocks to uniform plexes, 506. Any number of parallel plexes may be formed depending on the parallelism requirements and network/system constraints. Typical numbers of parallel plexes are two, four, or eight streams, though more streams may be used as well. Once the plex streams are defined, the process proceeds through parallel processing threads 508a-d, for the case of four separate streams denoted Plex1, Plex2, Plex3, and Plex4. Each plex process thread comprises constructing a plexn disk image. Each plex stream location is shared and embedded with the next plex, so as shown: the plex 1 stream location is shared with plex2 and embedded in the plex2 PLE, the plex2 location is shared with plex3 and embedded in the plex3 PLE, the plex3 location is shared with plex4 shared with plex4 and embedded in the plex4 PLE. The individual plexn streams are then streamed to the backup media as shown in blocks 510a-d. For AFTD devices, a mount of the last differencing disk presents a full backup saveset. In this description, PLE represents the parent locator entry metadata of the virtual disk format.

Figure 6:
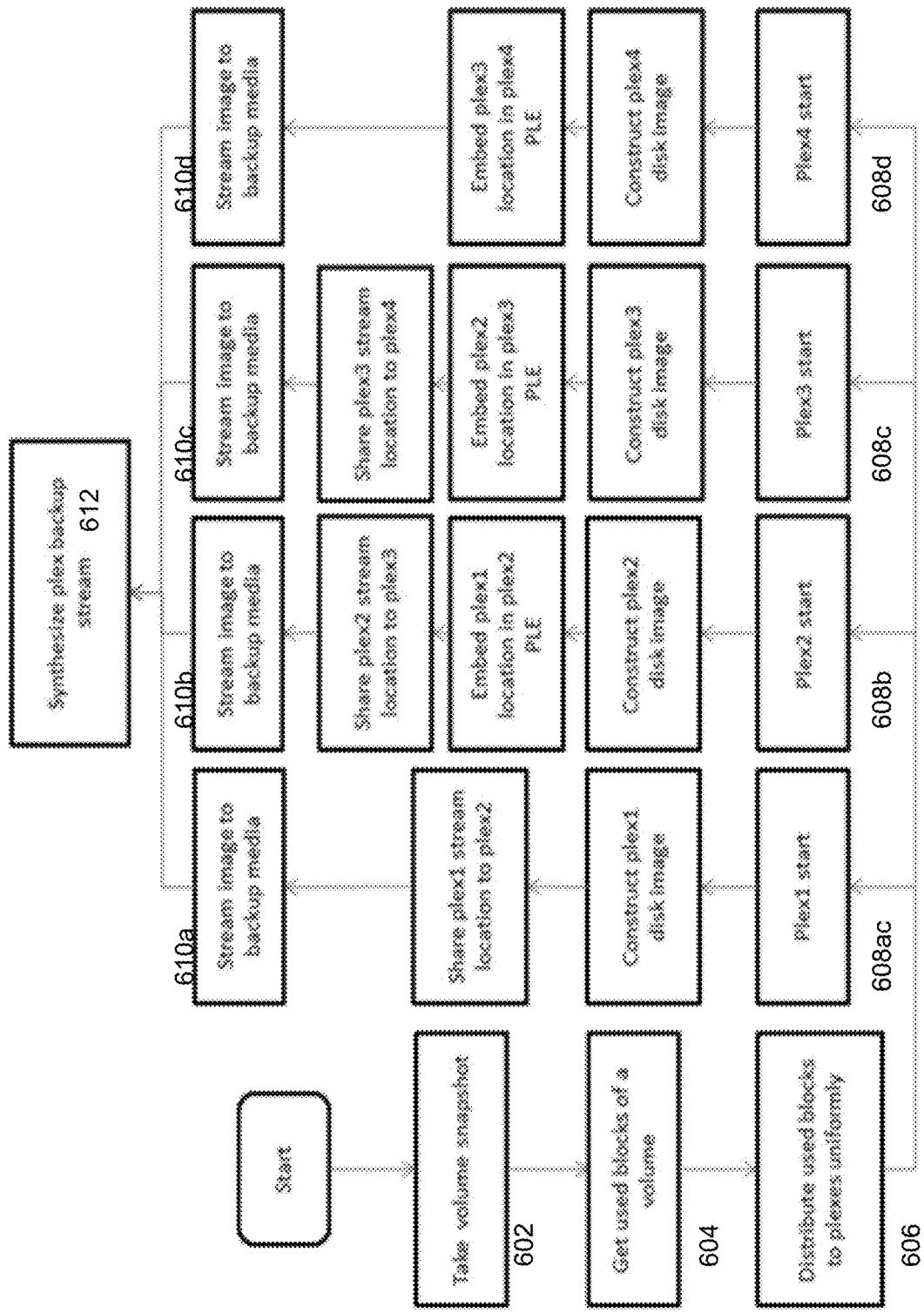
FIG. 6 is a flowchart that illustrates a method of performing block based striped backups in a Data Domain system, under some embodiments.

FIG. 6 is a flowchart that illustrates a method of performing block based striped backups in a Data Domain system, under some embodiments. The process of FIG. 6 for Data Domain is essentially equivalent to that of FIG. 5 for AFTD devices except for the presentation of the full backup saveset. Whereas, for AFTD, mounting the last differencing disk produces the full backup saveset, DD systems require synthesizing the plex backup streams to produce the full backup saveset. Thus, as shown in FIG. 6, the striped backup process for DD devices begins (as with AFTD devices) by taking a volume snapshot, 602, getting the used blocks of the volume, 604 and distributing the used blocks to uniform plexes, 606. The process proceeds through parallel processing threads 608a-d, for the case of four separate streams (Plex1, Plex2, Plex3, and Plex4). As with AFTD devices, each plex stream location is shared and embedded with the next plex, so as shown: the plex 1 stream location is shared with plex2 and embedded in the plex2 PLE, the plex2 location is shared with plex3 and embedded in the plex3 PLE, the plex3 location is shared with plex4 shared with plex4 and embedded in the plex4 PLE. The individual plexn streams are then streamed to the backup media as shown in blocks 610a-d. As shown in FIG. 6, for DD devices, the four plex streams 610a-d are synthesized 612 to produce a full backup saveset. Here PLE represents parent locator entry metadata of virtual disk format.

As previously described, the used blocks of the source volume are represented by a bitmap that is used to create a stream extent which a data structure represented as (Start-Offset, Length). A set of such extents would comprise a backup saveset. Example program code illustrating a way of implementing a process of splitting used blocks obtained from stream across plexes is provided below. Such program code may be embodied as a function: DistributeExtentsToPlexesUniformly( ) that is called to perform the split. The following program code is used to convert an extent set into subsets of equally sized extents which will form the payload for differencing disks:

```
bool_t ReSizeExtent(StreamExtent srcExtent, StreamExtent& resExtent,
int64_t ExtentUsedSize) {
                bool_t fOk = FALSE;
                resExtent = srcExtent;
                if (ExtentUsedSize >= 0 && ExtentUsedSize <=
srcExtent.Length) {
                   resExtent.Start = srcExtent.Start + ExtentUsedSize;
                   resExtent.Length = srcExtent.Length − ExtentUsedSize;
                        fOk = TRUE;
                }
                return (fOk);

}
```

-continued

```
bool_t isSplitRequired(StreamExtent& extent, int64_t size) {
                bool_t fOk = FALSE;
                if (size < extent.Length) {
                                fOk = TRUE;
                }
                return (fOk);
}
void StreamExtent::DistributeExtentsToSinglePlex(const
std::vector<StreamExtent>& srcExtents, std::vector<StreamExtent>&
plexExtents, const int64_t plexExtentsSize, int64_t& srcExtentIndex,
int64_t& IndexExtentUsedSize) {
                int64_t sizeToProcess = plexExtentsSize;
                int64_t srcExtentsCount = srcExtents.size( );
                /* reserving plexExtents size as srcExtents, this can
happen in worst case */
      while (sizeToProcess > 0 && srcExtentIndex < srcExtentsCount) {
                                StreamExtent reSizedExtent;
                                ReSizeExtent(srcExtents[srcExtentIndex]
, reSizedExtent, IndexExtentUsedSize);
                /* check that splitting the extent is required or not */
                /* split may be required if current extent has to be
spilt across plexes */
                if (isSplitRequired(reSizedExtent, sizeToProcess)) {
                /* splitting the extent required */
            StreamExtent partExtent(reSizedExtent.Start, sizeToProcess);
                                plexExtents.push_back(partExtent);
                                IndexExtentUsedSize += sizeToProcess;
                                    sizeToProcess = 0;
                                    } else {
                        /* splitting is not needed */
                                plexExtents.push_back(reSizedExtent);
                                    IndexExtentUsedSize = 0;
                                    srcExtentIndex++;
                                    sizeToProcess -= reSizedExtent.Length;
                                    }
                }
}
void StreamExtent::DistributeExtentsToPlexesUniformly(
      const std::vector<StreamExtent>& srcExtents, // (input)Source
stream extent list
      std::vector<std::vector<StreamExtent> >& plexExtentsSet, //
(output)List containing subset of extents
      int plexCount // number of plexes) {
                // Allocate memory for the plexExtentSet
                plexExtentsSet.reserve(plexCount);
                // calculate the total size of all extents
int64_t srcExtentsSize = StreamExtent::Size(srcExtents);
                // calculate the size of individual plexes
int64_t plexExtentSize = Utilities::Ceil(srcExtentsSize, plexCount);
                int64_t maxPlexExtents = srcExtents.size( );
                int64_t srcExtentIndex = 0;
                int64_t IndexExtentUsedSize = 0;
                // get the extents for each plex
         for (int PlexIndex = 0; PlexIndex < plexCount; PlexIndex++)
{
        std::vector<StreamExtent> plexExtents;
        plexExtents.reserve(maxPlexExtents);
        DistributeExtentsToSinglePlex(srcExtents, plexExtents,
plexExtentSize, srcExtentIndex, IndexExtentUsedSize);
                        plexExtentsSet.push_back(plexExtents);
                }
}
```

The programming code provided above is intended to be for illustration only, and any appropriate program or code segment may be used in conjunction with or to implement aspects of the embodiments described herein.

Embodiments may be used in conjunction with a variety of different backup strategies, such as those that involve a combination of full and incremental or differential backups. A full backup backs up all files from a data source in a specified backup set or job, while an incremental backup backs up only changed and new files since the last backup. During an incremental backup procedure, an application may walk the file system and find which of the files that has been changed. Embodiments may also be used with incremental backup systems that use a changed block tracking (CBT) feature, such as provided by a virtual machine monitor or manager to keep track of data blocks changed since last backup. The CBT changes are captured in a separate file which links to its immediate parent.

Certain test results have been produced for a Data Domain system with 1000 GB of backup data and show (for a certain test configuration) that striped block based backups for Data Domain are roughly 4 to 4.5 times faster than normal block based backups, and that a parallelism of four stripes are roughly 20% faster than 2 two stripes. Similarly, for an AFTD system with 1000 GB backup data, test results show that striped block based backups are 1.5 times faster than normal block based backups, and that four stripes are roughly 6% faster than two stripes. Such test results are provided for purposes of illustration only, and results may vary depending on system configuration and data backup implementations.

Figure 7:
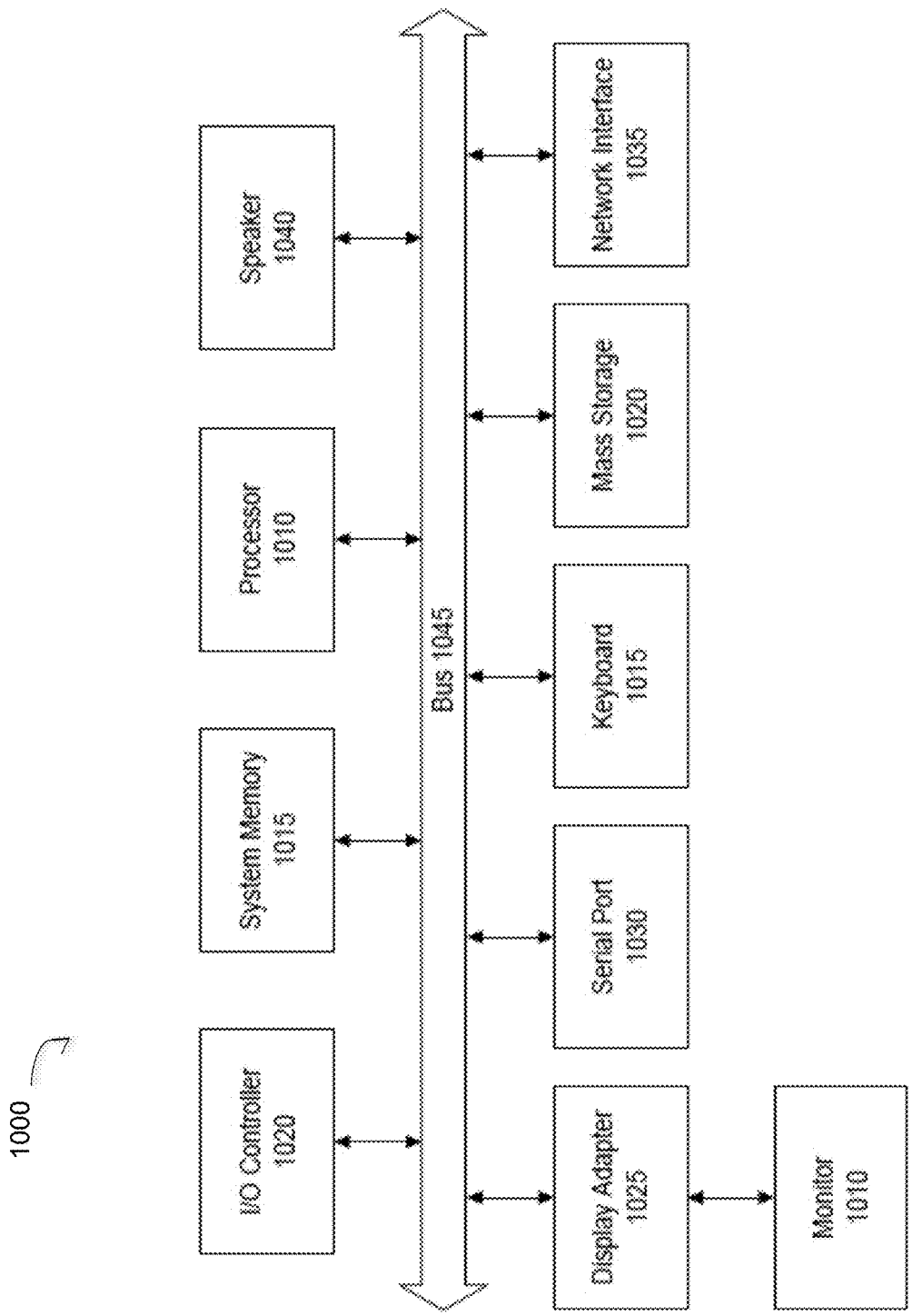
FIG. 7 is a block diagram of a computer system used to execute one or more software components of a block based striped backup process, under some embodiments.

As described above, in an embodiment, system 100 includes a block based striped backup process 116 that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein. FIG. 7 is a block diagram of a computer system used to execute one or more software components of the described process, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 7 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

Embodiments may be applied to data, storage, industrial networks, and the like, in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers, and data are maintained and provided through a centralized cloud-computing platform.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of performing block based striped backups in a storage system, comprising:
    obtaining a used block bitmap for a source volume to be backed up;
    defining a number of parallel save streams to simultaneously transmit separate data streams from the source volume to backup media of the storage system;
    converting the used block bitmap to the respective data streams based on the number of defined parallel save streams;
    embedding each data stream in a differencing disk payload; and
    maintaining a differencing disk chain across all data streams to create a last differencing disk that refers to all preceding differencing disks.

2. The method of claim 1 wherein the storage system comprises a deduplication storage system, and wherein the backup is performed between nodes comprising one of data domain (DD) devices and advanced file type device (AFTD) devices.

3. The method of claim 2 wherein the storage system comprises AFTD devices and further comprises mounting the last differencing disk to present a complete saveset on the backup media of the storage system.

4. The method of claim 2 wherein the storage system comprises DD devices and further comprises synthesizing the respective data streams after a backup operation to present a complete saveset on a backup media of the storage system.

5. The method of claim 1 wherein each data stream is made up of extents converted from a part of the used block bitmap of the source volume.

6. The method of claim 5 wherein all of the data streams are equal in size to each other.

7. The method of claim 1 wherein the parallel save streams comprise two, four, or eight separate save streams.

8. The method of claim 7 wherein the storage system comprises a random access storage device.

9. The method of claim 8 wherein the random access storage device comprises one of a disk-based storage device, a redundant array of independent disks, or a virtual disk (VHD).

10. A method for performing block based striped backups in a storage system, comprising:
    determining sets of used blocks in a source volume and organizing the sets of used blocks into individual respective data streams based on a defined parallelism, wherein each data stream comprises extents converted from a part of a used block bitmap of the source volume; and
    streaming separate volume extents for each data stream in parallel through respective data streams to backup media of the storage system to form a backup data saveset comprising individual data stream backup files concatenated together to form a single saveset.

11. The method of claim 10 wherein the respective data streams are equal in size to one another.

12. The method of claim 11 wherein the individual data streams are defined by respective volume extents denoted plexn volume extents for n separate data streams.

13. The method of claim 12 wherein the number n of separate data streams comprises the number of data streams that can be supported by a differencing disk chaining mechanism of the storage system.

14. The method of claim 10 wherein the storage system comprises a deduplication storage system, and wherein the backup is performed between nodes comprising one of data domain (DD) devices and advanced file type device (AFTD) devices.

15. The method of claim 14 wherein the storage system comprises AFTD devices and further comprising a third component embedding each data stream in a differencing disk payload, maintaining, a differencing disk chain across all data streams, and mounting the last differencing disk to present a complete saveset on the backup media of the storage system.

16. The method of claim 14 wherein the storage system comprises DD devices and further comprises a third component synthesizing the respective data streams after a backup operation to present a complete saveset on a backup media of the storage system.

17. The method of claim 10 wherein the storage system comprises a random access storage device embodied as either a disk-based storage device or a redundant array of independent disks, or virtualized storage (VHD).

18. A computer program product, comprising a non-transitory computer-readable medium having a computer-readable program code embodied therein, the computer-readable program code adapted to be executed by one or more processors to implement a method for performing block based striped backups in a storage system, by:
    obtaining a used block bitmap for a source volume to be backed up;
    defining a number of parallel save streams to simultaneously transmit separate data streams from the source volume to backup media of the storage system;
    converting the used block bitmap to the respective data streams based on the number of defined parallel save streams;
    embedding each data stream in a differencing disk payload; and
    maintaining a differencing disk chain across all data streams to create a last differencing disk that refers to all preceding differencing disks.

19. The computer program product of claim 18 wherein the storage system comprises a deduplication storage system, and wherein the backup is performed between nodes comprising one of data domain (DD) devices and advanced file type device (AFTD) devices.

20. The computer program product of claim 19 wherein the storage system comprises one of:
    AFTD devices and the method further comprises mounting the last differencing disk to present a complete saveset on a backup media of the storage system, or
    DD devices and the method further comprises synthesizing the respective data streams after a backup operation to present a complete saveset on the backup media of the storage system.

* * * * *